United States Patent
Eichler

(10) Patent No.: US 12,270,418 B2
(45) Date of Patent: Apr. 8, 2025

(54) REMOTE FIELD FAN BALANCING SYSTEM

(71) Applicant: Sebastian Eichler, Jarrell, TX (US)

(72) Inventor: Sebastian Eichler, Jarrell, TX (US)

(*) Notice: Subject to any disclaimer, the term of this patent is extended or adjusted under 35 U.S.C. 154(b) by 0 days.

(21) Appl. No.: 18/338,600

(22) Filed: Jun. 21, 2023

(65) Prior Publication Data
US 2023/0407883 A1    Dec. 21, 2023

Related U.S. Application Data

(60) Provisional application No. 63/366,711, filed on Jun. 21, 2022.

(51) Int. Cl.
*F04D 29/66* (2006.01)
*F04D 25/08* (2006.01)
(Continued)

(52) U.S. Cl.
CPC ......... *F04D 29/662* (2013.01); *F04D 27/001* (2013.01); *G01M 1/32* (2013.01); *F04D 25/088* (2013.01)

(58) Field of Classification Search
CPC .... F04D 29/662; F04D 27/001; F04D 25/088; G01M 1/32
See application file for complete search history.

(56) References Cited

U.S. PATENT DOCUMENTS 5,988,978 A * 11/1999 Pearce ............... F04D 25/088
416/62
2005/0188765 A1    9/2005 Care et al.
(Continued)

FOREIGN PATENT DOCUMENTS

CN      2462117       11/2001
CN   203929323 U     11/2014
(Continued)

OTHER PUBLICATIONS

Adash, Easy balancing with vibration meter and mobile app, Oct. 31, 2018, Youtube, https://www.youtube.com/watch?v=LvOrBQcnQfk (Year: 2018).*

(Continued)

*Primary Examiner* — Topaz L. Elliott
*Assistant Examiner* — Andrew J Marien
(74) *Attorney, Agent, or Firm* — Thompson Patent Law Offices PC

(57) ABSTRACT

Apparatus and associated methods relate to apparatus for balancing a fan. In an illustrative example, a fan balancing system may include a local device and a remote device. For example, the local device may include a sensing unit and a processing unit. The remote device may, for example, include a user interface and a controller wirelessly coupled to the local device. For example, the controller may receive a user input including a total number of blades of a fan from the user interface. When the fan is activated, a condensed imbalance profile may be received wirelessly from the local device releasably coupled to the fan. In some implementations, the controller may generate a balancing matrix including combinations of weights and positions of the weights along one or more blades of the fan. Various embodiments may advantageously generate a placement combination of weights to re-balance the fan remotely.

10 Claims, 7 Drawing Sheets

(51) Int. Cl.
*F04D 27/00* (2006.01)
*G01M 1/32* (2006.01)

(56) References Cited

U.S. PATENT DOCUMENTS

| | | | | |
|---|---|---|---|---|
| 2009/0162197 | A1* | 6/2009 | Klemo | F04D 29/662 |
| | | | | 416/1 |
| 2015/0315917 | A1* | 11/2015 | Shen | F04D 29/662 |
| | | | | 416/1 |
| 2016/0032725 | A1 | 2/2016 | Heidari et al. | |
| 2016/0349137 | A1 | 12/2016 | Guo et al. | |
| 2019/0264567 | A1 | 8/2019 | Harrison | |

FOREIGN PATENT DOCUMENTS

| | | |
|---|---|---|
| CN | 111307373 A | 6/2020 |
| KR | 101182537 B1 | 9/2012 |

OTHER PUBLICATIONS

Ceilingfanbalancer.com, Ceiling Fan Balancer, Sep. 25, 2020, pseudomath LLC (Year: 2020).*

Acoem, Balancing How To #5—How A Correction Weight and Location is Calculated—Acoem USA, Oct. 9, 2019, accessed May 23, 2022, https://acoem.us/blog/other-topics/balancing-how-to-5-how-a-correction-weight-and-location-is-calculated/, htttps://acoem.us/blog/other-topics/balancing-how-to-5-how-a-correction-weight-and-location-is-calculated/.

Adash, Balancer App Free Balancing Application, accessed May 23, 2023, https://adash.com/software-vibration-analysis/balancer-app.

Foiles, W, Weight Splitting into More than Two Location, p. 11, accessed May 23, 2022, https://www.researchgate.net/publication/315690479_Weight_Splitting_into_More_than_Two_Location.

Kelm et al, Rotor Balancing Tutorial, p. 29, 2016.

Pump Calcs, Acceleration in G's to displacement in mils pk-pk—Pump Calcs, accessed May 23, 2022, http://pumpcalcs.com/calculators/view/acceleration-displacement/.

Tyl, D, Ceiling Fan Balancer—Wobble Fix Tool, Apple AppStore, accessed May 23, 2022, https://apps.apple.com/us/app/ceiling-fan-balancer/id1210278763.

Vaughan, J, Static and Dynamic Balancing using portable measuring equipment, 2nd edition, Bruel and Kjaer, accessed May 23, 2022, https://www.bksv.com/media/doc/17-227.pdf.

Vibration School, The Difference Between RMS, Peak and Peak to Peak Amplitudes, accessed May 23, 2022, http://www.vibrationschool.com/mans/Plots/Plots03.htm.

Tractian, Asset Management and Condition Monitoring in one place, in the palm of your hand, accessed Jul. 28, 2023, https://tractian.com/en/app-monitoring-management.

Tractian, How does Smart Trac work?, Facebook, accessed Jul. 28, 2023, https://www.facebook.com/get.tractian/videos/how-does-smart-trac-work/1243123503164153/.

Tractian, Vibration Analysis and Proactive Maintenance for your critical assets, accessed Jul. 28, 2023, https://tractian.com/en/product/vibration-sensor/vibration-analysis.

* cited by examiner $\vec{d}$ - desired balance weight vector $\alpha$ - desired balance weight angle $d$ - desired balance weight magnitude $\alpha_1, \alpha_2$ - available angles to add balance weights $\vec{V}_1, \vec{V}_2$ - split weights, vector sum = $\vec{d}$ $V_1, V_2$ - split weights magnitudes

US 12,270,418 B2

REMOTE FIELD FAN BALANCING SYSTEM

CROSS-REFERENCE TO RELATED APPLICATIONS

This application claims the benefit of U.S. Provisional Application Ser. No. 63/366,711, titled "Remote Field Fan Balancing System," filed by Sebastian Eichler, on Jun. 21, 2022. This application incorporates the entire contents of the foregoing application(s) herein by reference.

TECHNICAL FIELD

Various embodiments relate generally to fan balancing devices and methods.

BACKGROUND

A ceiling fan is an electrically powered fan mounted on the ceiling of a room or space. Most ceiling fans include, for example, multiple hub-mounted rotating blades (e.g., 2, 3, 4, 5) to circulate air. The blades are rotated by an electrical motor. Usually, the electrical motor may be connected, for example, to a (e.g., wall mounted) controlling device. For example, a user may use the controlling device to vary a rotation speed of the ceiling fan.

Sometimes, a ceiling fan may have an imbalance of weight between the multiple fan blades. This could, in some cases, cause wobbling of the ceiling fan. This can happen due to a variety of factors, including blades being warped, blade irons being bent, blades or blade irons not being screwed on straight, and/or weight variation between blades. For example, if some or all of the fan blades do not exert an equal force on the air (e.g., due to varying impact angles of the fan blades), vertical reaction forces resulting from unbalance dynamics may cause wobbling. Wobbling may sometimes be caused by a motor flaw. Wobbling is not affected by the way in which the fan is mounted or the mounting surface. In some examples, wobbling may generate noise that is uncomfortable to users near the ceiling fan. In some examples, a severe wobbling may cause light fixtures of the ceiling fan to gradually loosen over time and potentially fall, posing a risk of injury to anyone under the fan. Therefore, it is desirable to reduce wobbling.

SUMMARY

Apparatus and associated methods relate to apparatus for balancing a fan. In an illustrative example, a fan balancing system may include a local device and a remote device. For example, the local device may include a sensing unit and a processing unit. The remote device may, for example, include a user interface and a controller wirelessly coupled to the local device. For example, the controller may receive a user input including a total number of blades of a fan from the user interface. When the fan is activated, a condensed imbalance profile may be received wirelessly from the local device releasably coupled to the fan. In some implementations, the controller may generate a balancing matrix including combinations of weights and positions of the weights along one or more blades of the fan. Various embodiments may advantageously generate a placement combination of weights to re-balance the fan remotely.

In an illustrative example, Field Fan Balancing System (FFBS) may include a Fan Balancing Device (FBD) and a remote control device. The FBD, for example, may collect an imbalance vector including a magnitude and angle of imbalance of the fan, and a rotation speed of the fan. The collected data may, for example, be processed and packaged into a data package to be transmitted to the remote control device. The remote control device may, after receiving the data package, calculate a position of one or more balancing weights to be installed to re-balance the fan. Various embodiments may advantageously balance a fan in a short time with high accuracy.

Various embodiments may achieve one or more advantages. For example, some embodiments may advantageously save power by using a Bluetooth low energy transmitter. Some embodiments, for example, may advantageously improve accuracy by using trial weight.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
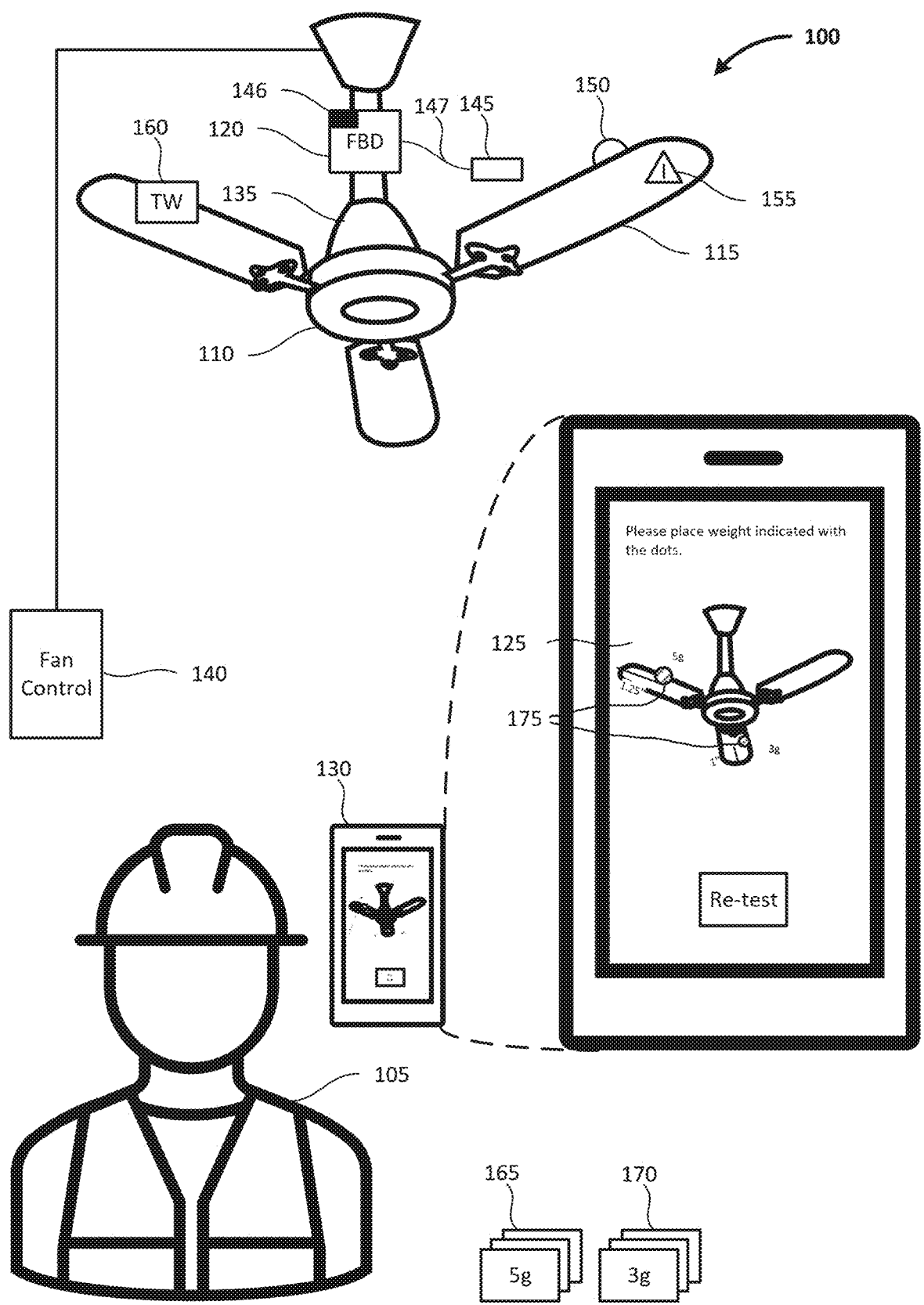
FIG. 1A depicts an exemplary Field Fan Balancing System (FFBS) employed in an illustrative use-case scenario.

FIG. 1A depicts an exemplary Field Fan Balancing System (FFBS) 100 employed in an illustrative use-case scenario. For example, a user 105 (e.g., an electrician, a handyman) may use the FFBS 100 to reduce imbalance of a suspended fan 110. For example, the suspended fan 110 may be wobbling because blades 115 of the suspended fan 110 are unbalanced. In some examples, the suspended fan 110 may be unbalanced because attacking angles of the blades 115 are different from each other.

As shown, the FFBS 100 includes a Fan Balancing Device (1-BD 120) and a Fan Balancing Application (FBA 125). In this example, the user 105 uses the FBA 125 on a mobile device 130. In some examples, the user 105 may use the FFBS 100 during installation of the suspended fan 110 (for balancing). In various implementations, the FFBS 100 may detect an imbalance at the suspended fan 110 and automatically determine at least one correction weight and weight placement location at one or more of the blades 115. For example, the FIBS 100 may advantageously save time and money for the user 105. In various examples, balancing the suspended fan 110 may, as an illustrative example, take a couple minutes (e.g., including set up) as opposed to a repetitive trial and error approach of the traditional balancing method (e.g., taking up to 1.5 hour or even more).

In some implementations, the FBD 120 may be mounted to a stationary point on the top of the fixture. In some implementations, the FBD 120 may transmit, for example, a calculated imbalance, rotations per minute, and a location of imbalance over a wireless signal to the FBA 125. For example, the FBA 125 may receive user input from the user 105. For example, the user input may include basic information about the suspended fan 110, including a number of blades at the suspended fan 110, and a diameter of the suspended fan 110. In some implementations, the FBA 125 may calculate an amount of one or more weights needed and one or more corresponding position of the weights on the blades 115.

The blades 115, as shown in FIG. 1A, are coupled to an electrical motor 135. For example, the electrical motor 135 may rotate the blades 115 at a rotational velocity controlled by a fan control 140. For example, the fan control 140 may control the suspended fan 110 to rotate at a high speed, a medium speed, and a low speed.

In this example, the FBD 120 includes a reed switch 145 and an accelerometer 146. In some implementations, the reed switch 145 may be electrically and physically coupled to the FBD 120 via a rigid flex arm 147 (e.g., a goose neck wire). The rigid flex arm 147 may, for example, be manipulated by the user 105 into a desired configuration (e.g., position, orientation), and then remain substantially fixed (e.g., rigidly) in the desired configuration until force above a (predetermined) threshold is applied (e.g., by the user 105). For example, the rigid flex arm 147 may be constructed of a series of jointed segments. In some implementations, for example, the rigid flex arm 147 may include a malleable wire.

In this example, the FBD 120 may use the reed switch 145 to measure a rotational speed of a magnet 150. For example, the reed switch 145 may be positioned over the magnet 150 such that it triggers when the magnet 150 is in range and does not interfere with the rotation of the fixture. In this example, the magnet 150 is magnetically coupled to one of the blades 115 that is marked with an adhesive 155 (e.g., removable adhesive label, removable marker, using an erasable marker pen) as a blade I. For example, as the magnet 150 rotates with the blade I, the reed switch 145 may measure the rotational speed of the magnet 150 to deduce the angular velocity of the suspended fan 110. The accelerometer 146, for example, may measure the vibration of the suspended fan 110.

The FFBS 100 further includes a trial weight (TW 160), a heavier correction weight (HCW 165), and a lighter correction weight (LCW 170). For example, the TW 160, the HCW 165, and/or the LCW 170 may have a predetermined (e.g., predefined) weight (e.g., 10 g-30 g) releasably coupled to another blade different from the blade I. In some implementations, the user 105 may be instructed, by the FBA 125, to place the TW 160 to the end of one of the blades 115, for example, at least 120 degrees offset from an angle of the axis having the highest magnitude of vibration. In some examples, the TW 160 may be heavy enough to cause a visual imbalance in the suspended fan 110 while it is on and rotating at maximum speed.

After the FBD 120 determines an imbalance vector based on computation of a magnitude of imbalance, a location of the imbalance, and rotational velocity relative to the imbalance, for example, collected data may be processed and transmitted wirelessly to the FBA 125. In some implementations, after receiving the collected data, the FBA 125 may determine how much weight to use to balance the suspended fan 110 and locations to place the HCW 165 and/or the LCW 170 on the blades 115. For example, due to the finite angle and length available to place the HCW 165 and the LCW 170, and a finite number combination of the HCW 165 and the LCW 170, the FBA 125 may generate a combination of $n^{th}$ balancing vectors represented by $V_n$=(a combination of LCW/HCW, a specific blade, placement location of the specific blade) so that Correction Balancing Weight (CBW) may be calculated, for example, by the following equation:

$$CBW = \Sigma v_n$$

For example, the CBW may compensate an imbalance of the suspended fan 110. Discussion of how to generate the CBW and $V_n$ are described further with reference to FIG. 1B and FIG. 6. In various examples, the FBA 125 may generate a CBW that may advantageously generate a higher accuracy in creating a better balance. removes the trial and error of finding balance and limits the amount of input the user has that could produce ineffective direction to balance the fan.

As an illustrative example shown in FIG. 1A, the FBA 125 displays dots 175 that indicate where the user 105 should place the HCW 165 and the LCW 170. The dots 175, for example, may include a text displayed next to them that are variable based on the size (e.g., grams) of a weight placed. The location of the dots 175, in some implementations, may be variable, with the distance displayed from near the blade. After the required weights are placed, the user 105 may send a re-test request to the FBD 120. For example, the FBA 125 may display a green check mark if the vibration of the suspended fan 110 is within a predetermined tolerance.

Figure 1B:
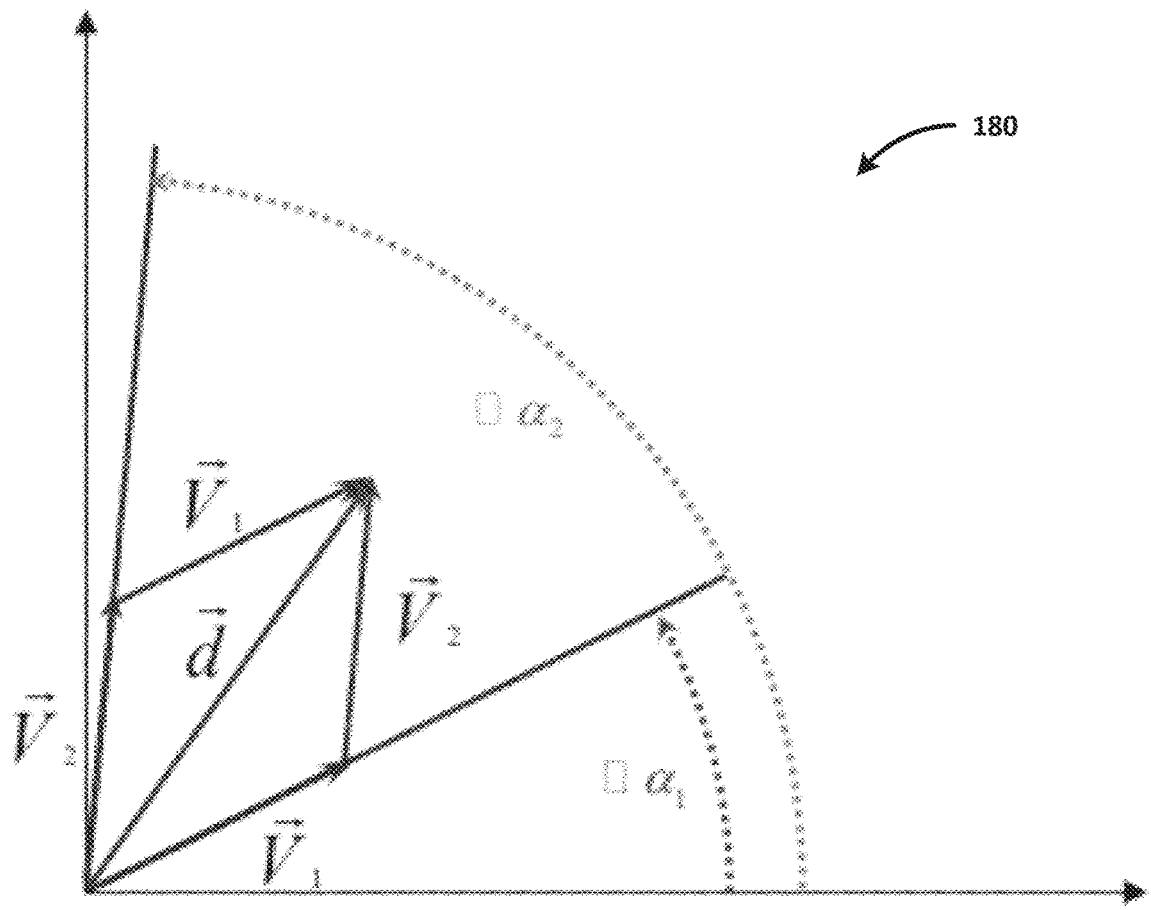
FIG. 1B is a vector diagram showing a desired balance weight and corresponding split weights for balancing a suspended fan.

FIG. 1B is a vector diagram 180 showing a desired balance weight and corresponding split weights and locations for balancing a suspended fan (e.g., the suspended fan 110). In this example, the desired balance weight may be represented by a vector $\vec{d}$. For example, the split weight weights and locations (as indicated by $\vec{V}_1$ and $\vec{V}_2$ in the vector diagram 180) are located at available angles $\vec{\alpha}_1$ and $\vec{\alpha}_2$ determined by a number of blades of the suspended fan. In this example, the suspended fan includes 3 blades, so $\vec{\alpha}_1=30°$ and $\vec{\alpha}_2=60°$ for example. In various implementations, the FBA 125 may solve for $\vec{V}_1$ and $\vec{V}_2$ so that, $\vec{V}_1 + \vec{V}_2 = \vec{d}$. In this example, the FBA 125 may solve the following equations for $\vec{V}_1$ and $\vec{V}_2$ $$\frac{V_2}{\sin(|\alpha - \alpha_1|)} = \frac{d}{\sin(180 - |\alpha_2 - \alpha_1|)} = \frac{V_1}{\sin(|\alpha_2 - \alpha|)}$$

As an illustrative example, to balance a fan the user may need 3.9 g of weight at the tip of a 52" fan that spins at 115 rpm. (313.112067807 inches per second), the FBA 125 may determine that a 5 g correction weight placed at 5.72" from the tip of the blade is required to balance the suspended fan properly.

Figure 2:
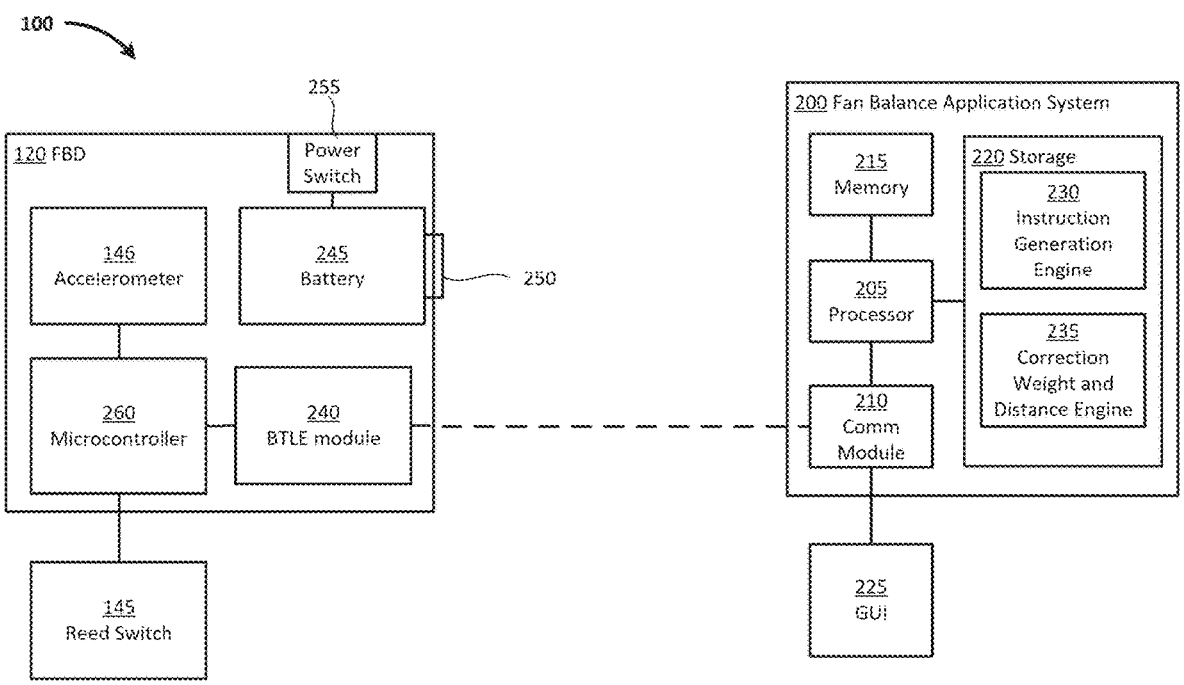
FIG. 2 is a block diagram depicting an exemplary FFBS.

FIG. 2 is a block diagram depicting an exemplary FFBS 100. The FFBS 100 includes the FBD 120 and a Fan Balancing Application System (FBAS 200). The FBAS 200 includes a processor 205. The processor 205 may, for example, include one or more processors. The processor 205 is operably coupled to a communication module 210. The communication module 210 may, for example, include wired communication. The communication module 210 may, for example, include wireless communication. As shown, the processor 205 is operably coupled to a memory module 215. The memory module 215 may, for example, include one or more memory modules (e.g., random-access memory (RAM)). The processor 205 includes a storage module 220. The storage module 220 may, for example, include one or more storage modules (e.g., non-volatile memory).

The storage module 220 includes an instruction generation engine (IGE 230) and a Correction Weight and Distance Engine (CWDE 235). In some implementations, the IGE 230 may generate an interactive display that guides a user (e.g., the user 105) through a fan balancing process. For example, at a start of the fan balancing process, the IGE 230 may display instructions on how to attach the magnet 150 and the TW 160 on the suspended fan 110. The CWDE 235, in some implementations, may determine placement of the HCW 165 and/or the LCW 170 on the suspended fan 110 to rectify imbalance on the suspended fan 110. In some examples, the IGE 230 may generate, based on results from the CWDE 235, a graphical display instructing the user 105 where to place one or more correction weights on a distance from a tip of a specific blade. In some examples, the placement may be presented as a percentage of a total length of the specific blade from the tip. For example, a length of the blade may advantageously be unknown.

In the depicted example, the communication module 210 is operably coupled to a graphical user interface (GUI 225). For example, the GUI 225 may be a display of the mobile device 130. The GUI 225 may, for example, display input widgets and results generated by the IGE 230. As shown in FIG. 2, the communication module 210 is wirelessly coupled to a Bluetooth Low Energy (BTLE) module 240. For example, the BTLE module 240 may be a Bluetooth transmitter. In some implementations, the BTLE module 240 may transmit measurement data from the reed switch 145 and the accelerometer 146. The 1-BD 120 includes a battery 245 (e.g., a 500 mAh battery) to provide power. For example, the battery 245 may be rechargeable via a micro USB port 250. A power switch 255 is included to power the FBD 120 on or off. The FBD 120 includes a microcontroller 260. For example, the microcontroller 260 may be a lower power controller configured to filter and transmit measurement data to the FBAS 200. In some examples, the controller may transmit filtered measurement data including a maximum vibration, a minimum vibration, a RPM, and degrees of rotation from time to time to the FBAS 200. In some implementations, the FBAS 200 may, after receiving the filtered measurement data, calculate a required position of balancing weight(s), and receive input from the user 105.

In various implementations, the FFBS 100 may include a local device (e.g., the FBD 120) releasably coupled to a fan (e.g., the suspended fan 110). For example, the local device may include a sensing unit (e.g., the accelerometer 146) and a control unit (e.g., the microcontroller 260). For example, the control unit may generate a condensed imbalance profile as a function of measurements detected by the sensing unit. For example, a remote device (e.g., the FBAS 200) may include a user interface (e.g., the GUI 225) and a controller (e.g., the processor 205). For example, the controller may be wirelessly coupled to the local device (e.g., via the communication module 210). For example, the user interface may receive a user input of a length of blades of the fan. In operation, the controller may receive wireless (via the BTLE module 240) the condensed imbalance profile from the local device to generate a balancing vector including a weight and a position of the weight along a longitudinal axis of a blade on the fan. For example, a balancing action may be displayed at the user interface based on the balancing vector.

As an illustrative example without limitation, without using the FFBS 100, an engineer may be required to iteratively perform steps of (a) measuring an imbalance of the fan by measuring vibrations and angular speed of each blades of the fan, (b) determine placements of combination of the HCW 165 and the LCW 170 if the imbalance is out of tolerance, (c) place the determined placements on the fan and test run the fan, and (d) repeat (a). In some examples, the aforementioned method would require a highly trained engineer to perform and take a long time (e.g., more than 1.5 hours). For example, the FFBS 100 may provide a technical solution to a technical problem by generating a guidance display to balance the fan within a few minutes, and without requiring a trained engineer. For example, the FFBS 100 may advantageously save costs in rebalancing the suspended fan 110.

Figure 3:
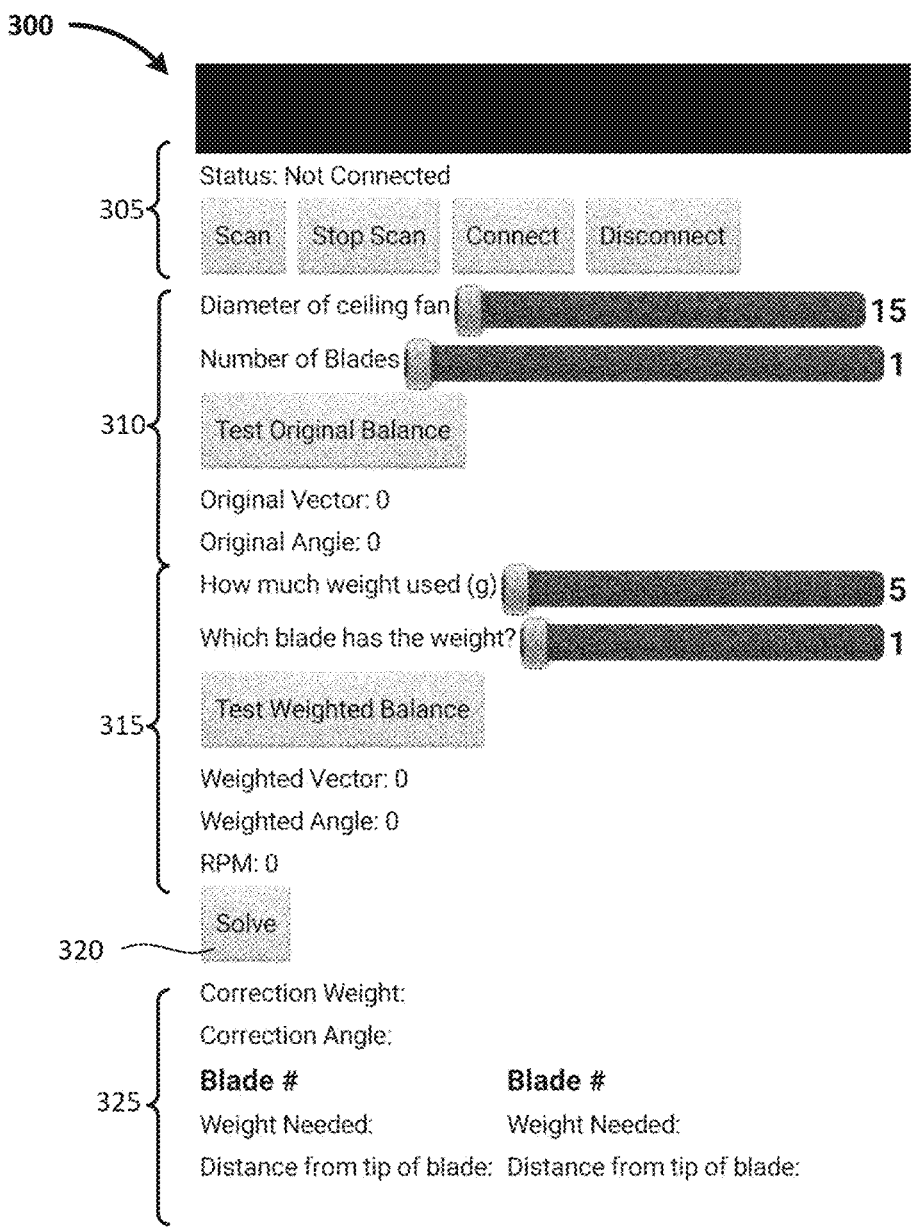
FIG. 3 depicts a schematic diagram of an exemplary graphical user interface for receiving user input during a fan balancing process.

FIG. 3 depicts a schematic diagram of an exemplary graphical user interface (GUI 300) for receiving user input during a fan balancing process. For example, the GUI 300 may be displayed when a user opens a balancing fan window in the FBA 125. In this example, the GUI 300 includes a connection area 305. As shown, the connection area 305 includes control to scan for and connect to a nearby FBD. In a fan details portion 310, a user may input basic details of a fan including a number of blades and a diameter of the fan. For example, the diameter may be calculated by measuring from the tip of one blade to the center of the fixture, then multiplying that number by two. For example, a distance from the tip of the blade to the center of fixture×2=diameter of the fan. In the fan details portion 310, the user may select to test original balance. For example, the fan may be tested without any TW attached. In some implementations, the user may select to test the original balance when the fan is rotating at a maximum speed (by operating the fan control 140).

In a test weight balance portion 315, a user may input trial weight (e.g., 15 g) currently attached to which blade of fan. The test weight balance portion 315 includes a test weighted balance button to start testing balance with the trial weight. After getting the result of the test weighted balance, the user may select a solve button 320 to solve for correction weights and placement of the correction weights that may be displayed at a result portion 325.

Figure 4:
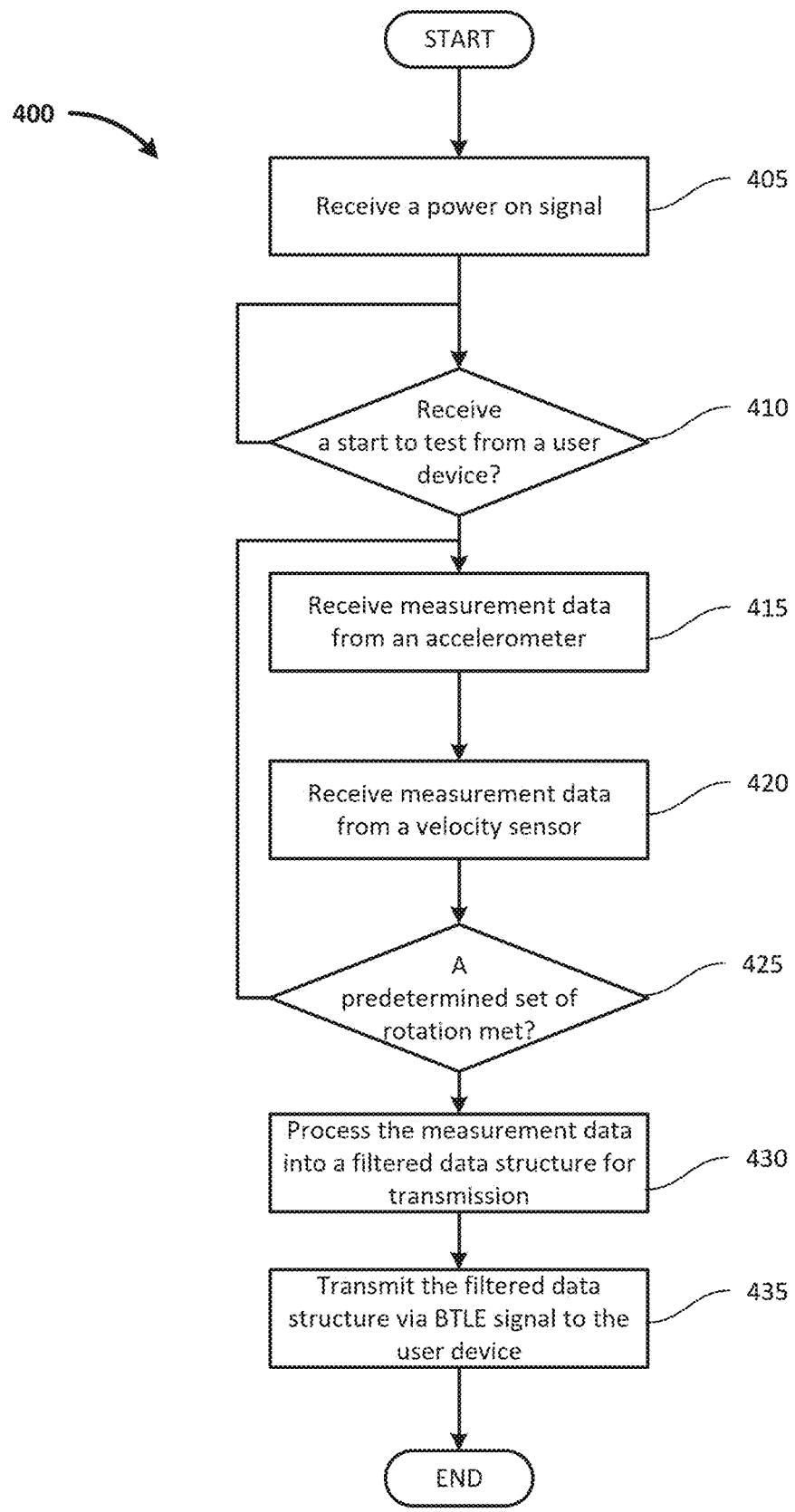
FIG. 4 is a flowchart illustrating an exemplary fan imbalance measurement method.

FIG. 4 is a flowchart illustrating an exemplary fan imbalance measurement method 400. For example, the microcontroller 260 of the FBD 120 may perform the method 400 to measure imbalance data of the suspended fan 110. The method 400 begins when a power on signal is received in step 405. For example, the power switch 255 may be turned on by a user.

Next, in a decision point 410, it is determined whether a start to test signal is received from a user device. For example, the start to test signal may be transmitted to the FBD 120 via Bluetooth wireless connection. If it is determined that a start to test signal is not received from a user device, then the decision point 410 is repeated. If it is determined that a start to test signal is received from a user device, in step 415, measurement data from the accelerometer is received. Next, in step 420, measurement data from a velocity sensor (e.g., the reed switch 145, a reflective optical sensor) is received. Next, in a decision point 425, it is determined whether a predetermined set of rotation is met. If it is determined that the predetermined set of rotation is not met, the step 415 is repeated. If it is determined that the predetermined set of rotation is met, then, the measurement data is processed into a filtered data structure for transmission in step 430.

In some implementations, the microcontroller 260 may use the measurement data from the accelerometer to calculate a magnitude of vibration at each axis throughout a set number of rotations. For example, the reed switch may generate a timestamp that measures the beginning and end of each rotation and associate a maximum measurement of each axis to a timestamp. Based on the beginning timestamp and the end timestamp, for example, the microcontroller 260 may determine a rpm (rotations per minute) of a fan. In some implementations, after the predetermined set of rotations is met, the microcontroller 260 may determine which axis had the highest magnitude of vibration. After the measurement data is processed, in step 435, the filtered data structure via BTLE signal is transmitted to the user device and the method 400 ends. For example, the magnitude of the axis that has the highest magnitude, the rpm, and the angle of the axis that has the highest magnitude is then sent wirelessly to the FBA 125.

Figure 5:
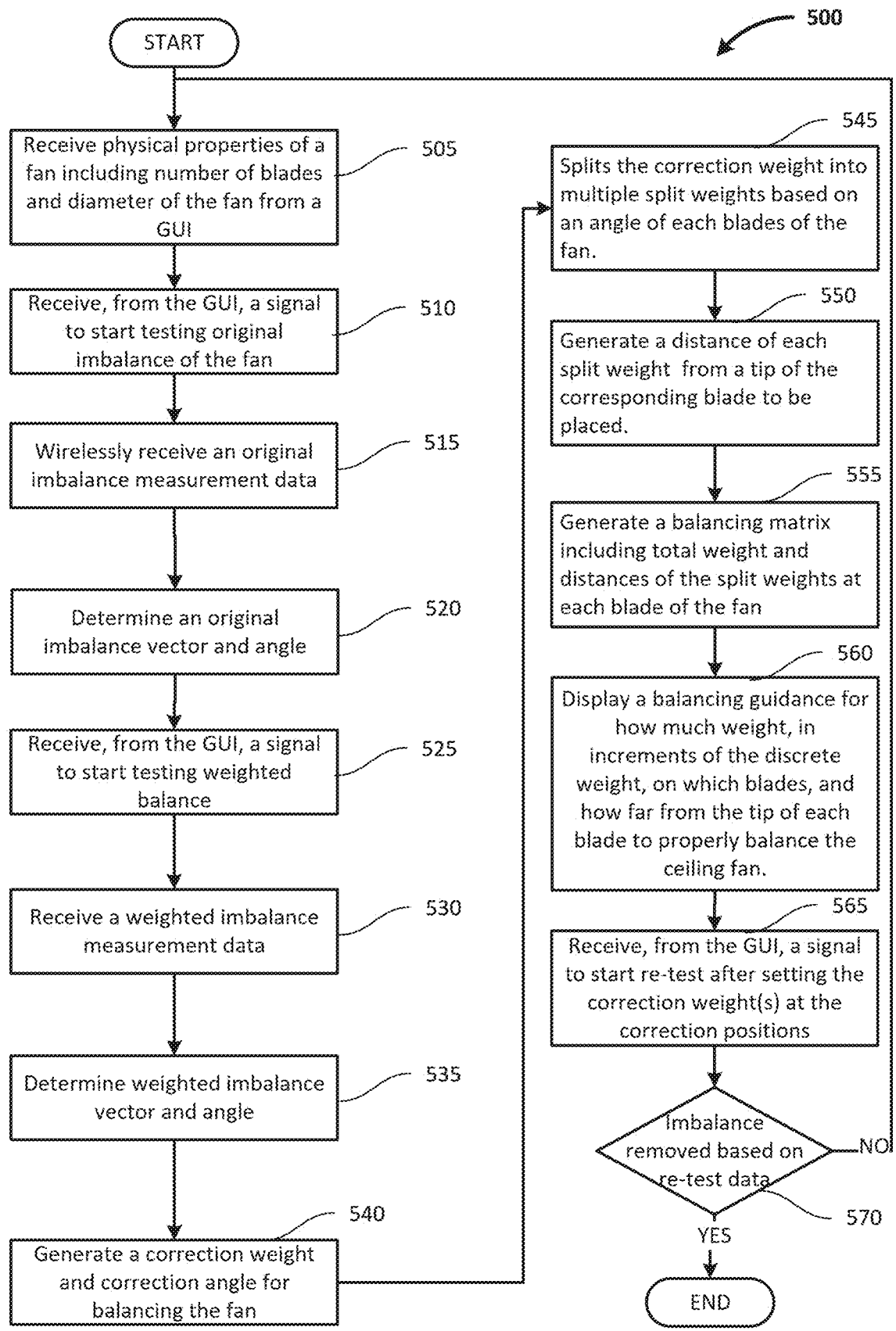
FIG. 5 is a flowchart illustrating an exemplary fan balancing weight and distance determination method.

FIG. 5 is a flowchart illustrating an exemplary fan balancing weight and distance determination method 500. For example, the processor 205 may perform the method 500 to generate at least one correction weight amount and corresponding placement location for balancing a fan. The method 500 begins when, in step 505, physical properties of a fan including number of blades and diameter of the fan are received from a GUI. For example, the user 105 may input information about the fan using the GUI 225. For example, angles of longitudinal axes of each blades of the rotating fan may be determined by evening distributing the axis among 360° of the rotating plane Next, in step 510, from the GUI, a signal is received to start testing an original imbalance of the fan. For example, the test original balance button described with reference to FIG. 3 may be selected to start testing the original imbalance of the fan. In step 515, an original imbalance measurement data is received wirelessly. For example, the imbalance measurement data (e.g., a condensed imbalance profile) may be received from the accelerometer 146 and a velocity sensor (e.g., the reed switch 145 and the magnet 150). After the original imbalance measurement data is received, an original imbalance magnitude and a corresponding angle are determined in step 520.

In step 525, from the GUI, a signal is received to start testing weighted balance. For example, the user may have attached a tested weight to the fan and the user may input which baled the test weight is on. Then the user may select to start testing a weighted imbalance. In step 530, a weighted imbalance measurement data is received. Next, a weighted imbalance magnitude and corresponding angle are determined in step 535. After the original measurement data and the weighted imbalance measurement data are collected, in step 540, a correction weight(s) and correction angle(s) are generated for balancing the fan. For example, the FBA 125 may run a series of calculations (as described with reference to FIG. 1B) to find how much weight is needed and where to balance the blade. For example, the FBA 125 may determine a correction vector by separately computing a correction weight and a correction angle. For example, the correction weight may be solved by the equation $$\text{Weight Added} - ((\text{Original Magnitude}/\text{Weighted Magnitude})*\text{Weight Added}) = 0$$

And the correction angle may be determined by solving the equation $$-\text{Weighted Angle} + (\text{Original Angle} + 180) + \text{Weighted Angle} = 0$$

After the correction weight and correction angle are determined, the correction weight is split into multiple split weights based on an angle of each of the blades of the fan in step 545. In step 550, a distance of each split weight from a tip of the corresponding blade to be placed is generated. For example, a centrifugal force that the split weights may be determined based on the measured RPM of the fan. In some examples, the FBA 125 may convert the split weight into discrete weight (e.g., 5-gram) increments to correspond to existing balancing weights of the FFBS 100. In some implementations, using the previously calculated centrifugal force and the split weight in grams divisible by the discrete weight, the FBA 125 may calculate the distance from the tip of the blade the weights need to be placed.

After the distance of each split weight from a tip of the corresponding blade to be placed is generated, in step 555, a balancing matrix including total weight and distances of the split weights at each blade of the fan is generated. For example, the CWDE 235 may generate the balancing matrix to be read by the IGE 230.

In step 560, instructions are displayed for how much weight, in increments of the discrete weight, on which blades, and how far from the tip of each blade to properly balance the ceiling fan. For example, the IGE 230 may generate the balancing action instruction based on the balancing matrix. Next, in step 565, from the GUI, a signal is received to start re-test after setting the correction weight(s) at the correction positions. In a decision point 570, it is determined whether the imbalance is removed based on re-test data. If it is determined that the imbalance is not removed, the step 505 is repeated. If it is determined that the imbalance is not removed, the method 500 ends.

Figure 6:
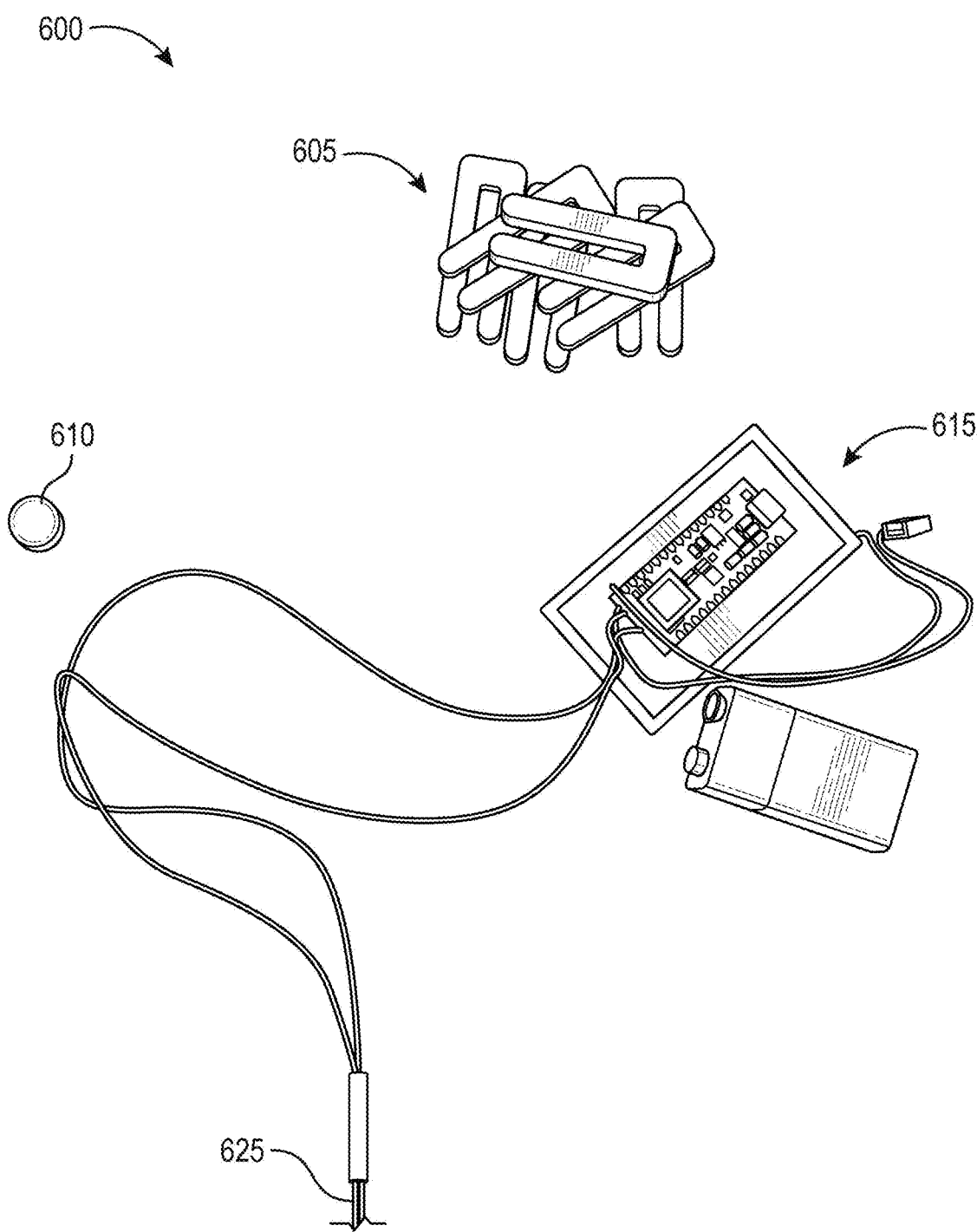
FIG. 6 shows exemplary components of an exemplary fan balance device.

FIG. 6 shows exemplary components of an exemplary fan balance device. In this example, a FFBS 600 includes a number of 5 g weights 605, a magnet 610, a controller 615, a battery 620, and a reed switch 625 (e.g., the reed switch 145). For example, the controller 615 may be powered by the battery 620. In some implementations, the controller 615 may include an accelerometer (e.g., the accelerometer 146) and a BLE module (e.g., the BTLE module 240). For example, the magnet 610 placed on a blade of a fan may trigger the reed switch 625 operably coupled to the controller 615. For example, the controller 615 may generate a filtered data structure to be transmitted to a user device (e.g., the mobile device 130). For example, the filtered data structure may be generated as a function of the rotation speed measured based on trigger signals received from the reed switch 625. For example, the user device may generate a balancing vector to balance a fan including a location and a number of the 5 g weights 605 to be placed on the fan.

Although various embodiments have been described with reference to the figures, other embodiments are possible.

For example, the accelerometer 146 may be replaced with a sensor capable of measuring small changes in movement or position (e.g., gyroscopes, tilt switches, magnetometers, optical distance sensors, light detection and ranging (LIDAR), radar sensors, photogrammetry). In some implementations, the BLTE module 240 may be exchanged with a satellite communication module, infrared communication module, radio communication module, microwave communication module, WLAN, cellular communication module, Zigbee, paging, hardwired communication over cables). For example, the reed switch 145 may be exchanged with an accelerometer, gyroscope, magnetometer, optical distance sensors, retro-reflective sensor, light detection and ranging (LIDAR), radar sensors, photogrammetry, magnetic switch, proximity switch, limit switch, speed switch, tachometer. For example, a reflective optical sensor may be used to measure the rpm and determine the angle of vibration. In some implementations, the reflective optical sensor is located on the top of a flexible but rigid arm.

In some implementations, the battery may be replaced with external direct line power, either from AC line voltage, a DC rectifier, an AC alternator, DC line voltage from a separate device's power source, or magnetic resonant coupling. The application program, in some implementations, may be hosted on any device capable of receiving user input, receiving either a wired or wireless signal, interpreting and running calculations based on those inputs, and/or communicating the results to the user.

Although an exemplary system has been described with reference to FIG. 1A, other implementations may be deployed in other industrial, scientific, medical, commercial, and/or residential applications. For example, the FFBS 100 may be used to balance a commercial fan (e.g., a Big A fan), a residential fan, oven fans, microwave fans, laboratory fans, refrigerator fans, and/or box fans.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a fan balancing system may include a local device may include a sensing unit and a processing unit. For example, the processing unit may be configured to generate a condensed imbalance profile as a function of measurements detected by the sensing unit. For example, the fan balancing system may include a remote device including a user interface and a controller. For example, the controller may be wirelessly coupled to the local device, and the user interface.

For example, the controller may include a data store may include a program of instructions. For example, the controller may include a processor operably coupled to the data store. For example, when the processor executes the program of instructions, the processor may cause operations to be performed to remotely generate a placement combination of predefined balancing weights to be installed to rebalance a fan. For example, the operations may include receiving, from the user interface, a user input corresponding to physical properties of a rotating fan. For example, the physical properties may include at least a total number of blades of the rotating fan. For example, angular locations of the blades on a rotating plane of the rotating fan may be determined by evening distributing the total number of blades among 360° of the rotating. For example, the operations may include receiving the condensed imbalance profile from the local device. For example, the local device may be releasably coupled to the rotating fan. For example, the operations may include generating a balancing matrix may include a weight and a position of the weight along a longitudinal axis of at least one of blades on the rotating fan. For example, the operations may include generating a balancing guidance to be displayed at the user interface based on the balancing matrix.

For example, the physical properties of the rotating fan may include a diameter of rotation of the rotating fan. For example, generating the condensed imbalance profile may include, at each of the blades, determine a magnitude of vibration at each of the blades throughout a predetermined number of rotations as a function of the measurements received from the sensing unit.

For example, the condensed imbalance profile may be received via Bluetooth Low Energy signal. For example, the condensed imbalance profile may include a magnitude of a highest vibrating blades corresponding to a blade having a highest vibration magnitude, a rotation per minute of the rotating fan, and an angular position of the highest vibrating blade.

For example, the local device further may include a rigid flex arm configured to releasably couple to a stationary base of the fan. For example, a position and an orientation of the local device may be selectively coupled to the rotating fan.

For example, the sensing unit may include a reed sensor. For example, the sensing unit may include an accelerometer. For example, the fan balancing system may include a first correction weight and a second correction weight. For example, the balancing matrix may include a combination of at least one balancing vector. For example, each of the balancing vector may include a weight combination of the first correction weight and the second correction weight, a selected blade of the rotating fan, and a distance along the diameter at the selected blade to place the weight combination.

For example, generate the balancing matrix may include generating a correction weight and a correction angle as a function of the condensed imbalance profile, determining possible split weights based on the first correction weight and the second correction weight, and the total number of blades, determining possible placement locations of the possible split weights based on the angular locations of the blades, and/or generating the balancing matrix such that the combination of the balancing vectors compensates an imbalance of the rotating fan.

In an illustrative aspect, a computer-implemented method performed by at least one processor to remotely generate a placement combination of predefined balancing weights to be installed to rebalance a fan, the method may include receive, from a user interface, a user input corresponding to physical properties of a rotating fan. For example, the physical properties may include at least a total number of blades of the rotating fan. For example, angular locations of each blade on a rotating plane of the rotating fan may be determined by evening distributing the total number of blades among 360° of the rotating. For example, the operations may include wirelessly receiving a condensed imbalance profile from a local device releasably coupled to the rotating fan. For example, the operations may include generating a balancing matrix may include a weight and a position of the weight along a longitudinal axis of at least one of blades on the rotating fan. For example, the operations may include generating a balancing guidance to be displayed at the user interface based on the balancing matrix.

For example, generate the condensed imbalance profile may include, at each of the blades, determine a magnitude of vibration at the blade throughout a predetermined number of rotations as a function of measurements received from the local device.

For example, the condensed imbalance profile may include a magnitude of a highest vibrating blades corresponding to a blade having the highest vibration magnitude, a rotation per minute of the rotating fan, and an angular position of the highest vibrating blade.

For example, the computer-implemented method may include a first correction weight and a second correction weight. For example, the balancing matrix may include a combination of at least one balancing vector. For example, each of the balancing vector may include a weight combination of the first correction weight and the second correction weight, a selected blade of the rotating fan, and a distance along the longitudinal axis of the selected blade to place the weight combination.

For example, generate a balancing matrix may include generate a correction weight and a correction angle as a function of the condensed imbalance profile, determine possible split weights based on the first correction weight and the second correction weight, and the total number of blades, determine possible placement locations of the possible split weights based on angular locations of the blades, and/or generate the balancing matrix. For example, the combination of the balancing vectors may compensate an imbalance of the rotating fan.

In an illustrative aspect, a computer program product may include a program of instructions tangibly embodied on a non-transitory computer readable medium wherein, when the instructions may be executed on a processor, the processor may cause fan rebalance operations to be performed to remotely generate a placement combination of predefined balancing weights to be installed to rebalance a fan. For example, the operations may include receive, from a user interface, a user input corresponding to physical properties of a rotating fan. For example, the physical properties may include at least a total number of blades of the rotating fan. For example, angular locations of each blade on a rotating plane of the rotating fan may be determined by evening distributing the total number of blades among 360° of the rotating.

For example, the operations may include wirelessly receiving a condensed imbalance profile from a local device releasably coupled to the rotating fan. For example, the operations may include generating a balancing matrix may include a weight and a position of the weight along a longitudinal axis of at least one of blades on the rotating fan.

For example, the operations may include generating a balancing guidance to be displayed at the user interface based on the balancing matrix.

For example, generating the condensed imbalance profile may include, at each of the blades, determine a magnitude of vibration at the blade throughout a predetermined number of rotations as a function of measurements received from the local device.

For example, the condensed imbalance profile may include a magnitude of a highest vibrating blades corresponding to a blade having the highest vibration magnitude, a rotation per minute of the rotating fan, and an angular position of the highest vibrating blade.

For example, the computer program product may include a first correction weight and a second correction weight. For example, the balancing matrix may include a combination of at least one balancing vector. For example, each of the balancing vector may include a weight combination of the first correction weight and the second correction weight, a selected blade of the rotating fan, and a distance along the longitudinal axis of the selected blade to place the weight combination.

For example, generating the balancing matrix may include generating a correction weight and a correction angle as a function of the condensed imbalance profile. For example, the generation may include determining possible split weights based on the first correction weight and the second correction weight, and the total number of blades. For example, the generation may include determining possible placement locations of the possible split weights based on the angular locations of the blades. For example, the generation may include generating the balancing matrix. For example, the combination of the balancing vectors may compensate an imbalance of the rotating fan.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A fan balancing system comprising:
   a local device comprising a sensing unit and a processing unit, wherein the processing unit is configured to generate a condensed imbalance profile as a function of measurements detected by the sensing unit; and
   a remote device comprising a user interface and a controller, wherein the controller is wirelessly coupled to the local device, wherein the controller comprises:
   a data store comprising a program of instructions; and,
   a processor operably coupled to the data store such that, when the processor executes the program of instructions, the processor causes operations to be performed to remotely generate a placement combination of predefined balancing weights to be installed to rebalance a fan, the operations comprising:
   receive, from the user interface, a user input corresponding to physical properties of the fan when rotating, wherein the physical properties comprise at least a total number of blades of the rotating fan, such that angular locations of the blades on a rotating plane of the rotating fan are determined by evening distributing the total number of the blades among 360 of the rotating plane;

receive the condensed imbalance profile from the local device, wherein the local device is releasably coupled to the rotating fan;

generate a balancing matrix comprising a weight and a position of the weight along a longitudinal axis of at least one of the blades on the rotating fan; and, generate a balancing guidance to be displayed at the user interface based on the balancing matrix.

2. The fan balancing system of claim 1, wherein the physical properties of the rotating fan comprise a diameter of rotation of the rotating fan.

3. The fan balancing system of claim 1, wherein generate the condensed imbalance profile comprises, at each of the blades, determine a magnitude of vibration at each of the blades throughout a predetermined number of rotations as a function of the measurements received from the sensing unit.

4. The fan balancing system of claim 1, wherein the condensed imbalance profile is received via Bluetooth Low Energy signal.

5. The fan balancing system of claim 1, wherein the condensed imbalance profile comprises a magnitude of a highest vibrating blade corresponding to one of the blades having a highest vibration magnitude, a rotation per minute of the rotating fan, and an angular position of the highest vibrating blade.

6. The fan balancing system of claim 1, wherein the local device further comprises a rigid flex arm configured to releasably couple to a stationary base of the fan, such that a position and an orientation of the local device is selectively coupled to the rotating fan.

7. The fan balancing system of claim 1, wherein the sensing unit comprises a reed sensor.

8. The fan balancing system of claim 1, wherein the sensing unit comprises an accelerometer.

9. The fan balancing system of claim 2, further comprising a first correction weight and a second correction weight, wherein the balancing matrix comprises a combination of at least one balancing vector, wherein each of the at least one balancing vector comprises a weight combination of the first correction weight and the second correction weight, a selected blade of the rotating fan, and a distance along a diameter at the selected blade to place the weight combination.

10. The fan balancing system of claim 9, wherein generate the balancing matrix comprises:

generate a correction weight and a correction angle as a function of the condensed imbalance profile;

determine possible split weights based on the first correction weight and the second correction weight, and the total number of blades;

determine possible placement locations of the possible split weights based on the angular locations of the blades; and, generate the balancing matrix such that a combination of the at least one balancing vector compensates an imbalance of the rotating fan.

* * * * *